INVENTOR
JAMES W. TOENSING

BY Stryker & Jacobson
ATTORNEYS

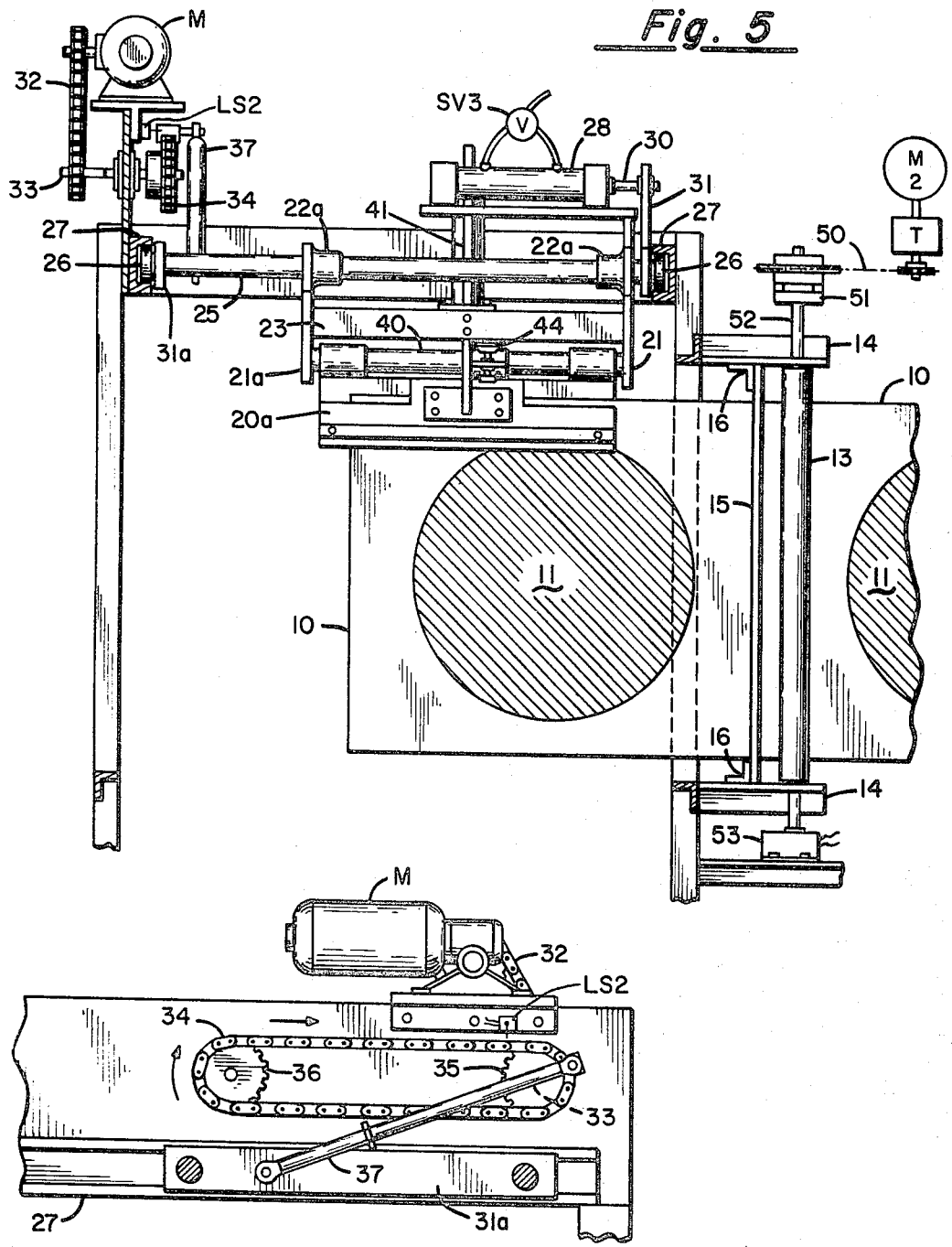

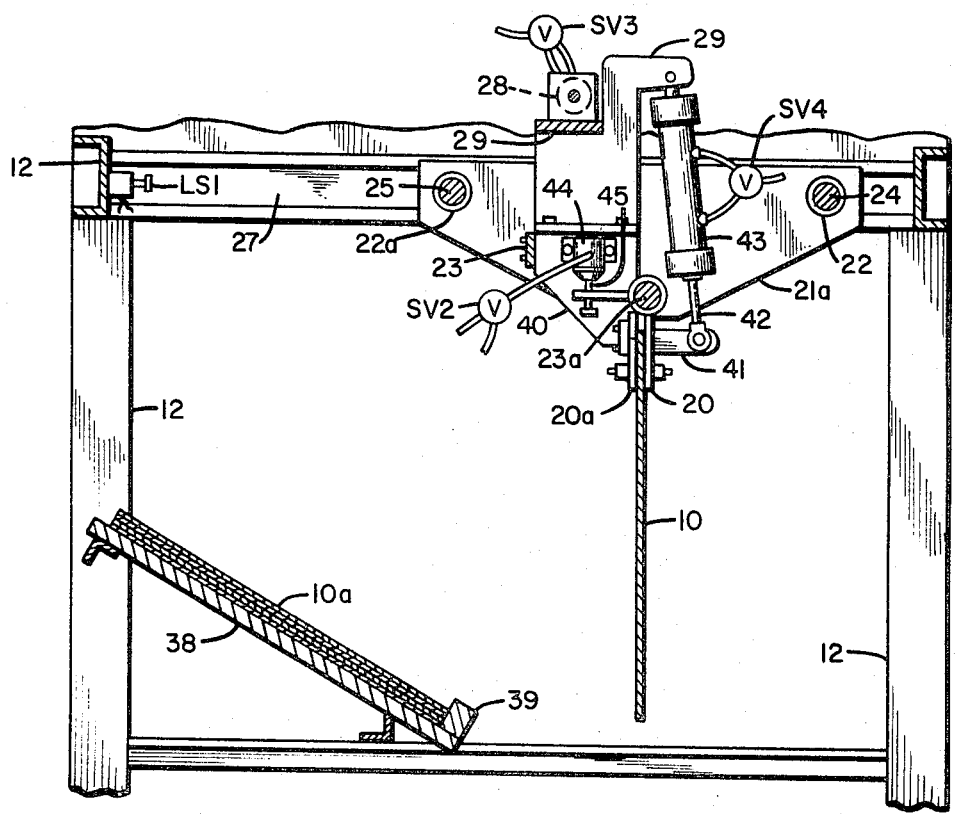
Fig. 3
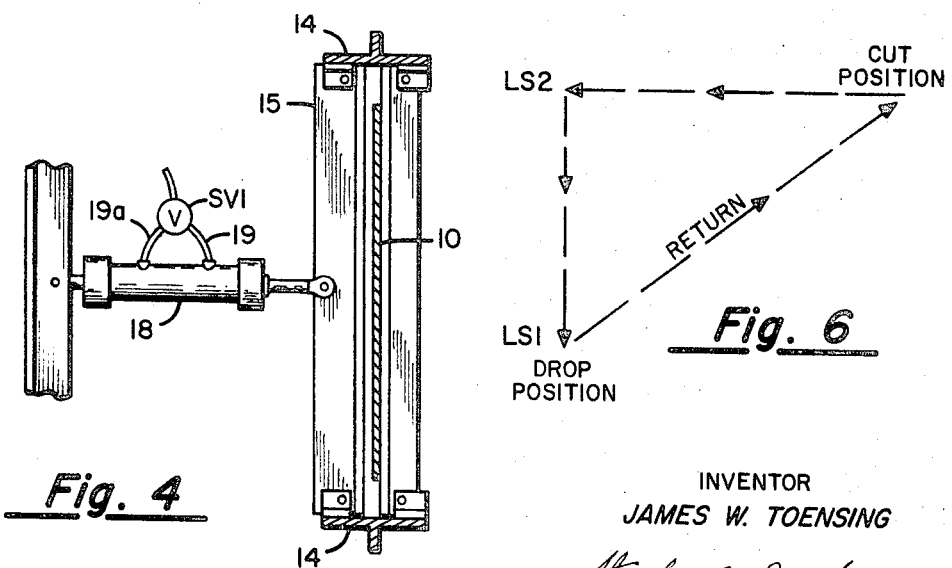
Fig. 4
Fig. 6
INVENTOR
JAMES W. TOENSING

United States Patent Office 3,436,996
Patented Apr. 8, 1969

3,436,996
WEB CUTTING MACHINE
James W. Toensing, Minneapolis, Minn., assignor, by mesne assignments, to Buckbee-Mears Company, St. Paul, Minn., a corporation of Minnesota
Filed Apr. 7, 1966, Ser. No. 540,937
Int. Cl. B26d 7/06, 5/20, 7/08
U.S. Cl. 83—87                      13 Claims

ABSTRACT OF THE DISCLOSURE

A machine for cutting and stacking sheets of metal which are severed off the front or leading end of a continuously moving web of metal which may be in the order of .006 inch thick and 22 to 24 inches wide and which is moving on edge in a vertical plane. During each cutting stroke, the front end section of the web is momentarily halted while clamping jaws grip the top edge. After the section is severed, the jaws which are carrying the sheet of metal are moved by a carriage to a stacking location where they are opened to release the sheet onto a stack. The carriage is then returned to the starting point to be ready for the next cut. In a preferred embodiment the carriage moves along the line of travel of the webbing and also laterally thereto before depositing the severed sheet. To return to the starting location the jaws must then be opened wide enough to pass over the next leading section of the web which is being fed in. For the most part, electrically responsive air cylinders provide the required driving forces and the sequential operation of these cylinders is electrically synchronized.

---

This invention relates to machines for cutting continuously moving webs into sections of predetermined length and particularly to a machine which operates on a metal web which is moving in a vertical plane, the web being flexible.

It is an object of this invention to provide mechanism for automatically cutting sections of an elongated web of the character described from the leading end thereof while it is moving continuously in a vertical plane and longitudinally.

A further object is to provide a machine of the character described with cutting means which are synchronized with the longitudinal movement of the web and with means for stacking or otherwise disposing of the severed sections out of the path of movement of the web.

Another object is to provide such a machine with web section gripping means adapted to engage the upper margin of each web section as it is severed from the leading end of the web, the mechanism including a carriage for the web section gripping means operative to move the web sections laterally of the web path, and means for actuating the gripping means to release the several web sections at a stack station.

A still further object is to provide electrical means for actuating and synchronizing the operation of the cutting, web section gripping, and releasing mechanisms.

Other objects will appear and be more fully pointed out in the following specification and claims.

One important field of use of this invention is in the manufacture of aperture masks for color television tubes. The material for such masks presently in wide use is stainless steel or nickel coated copper, on the order of .006 inch thick and from 22 to 24 inches wide. Such webs are fed to fully automatic machines from rolls of the metal several hundred feet in length. The operation may be made continuous further by welding to the trailing end of one roll the leading end of one or more additional rolls. Automatic machines are now in use which successively clean the web, apply photo-sensitive coatings of etching resist material to both sides of the moving web, photo-print the dot array for the apertures on both of the sensitized web surfaces, then develop the photoprinted surfaces, leaving the areas of the dots exposed, then etching out the exposed areas to form the multiplicity of apertures extending through the web for each mask, then removing the remaining etching resist material and finally cutting the moving web into sections each having a formanious area of the shape and size required for an aperture mask.

It will be evident that any substantial interruption in the continuous movement of the web at its leading end is extremely detrimental and must be compensated for by other means. The present machine is designed to avoid such interruptions and to facilitate the subsequent handling and packaging of the individual masks.

The invention will be best understood by reference to the accompanying drawings which illustrate by way of example and not for the purpose of limitation a preferred embodiment of the invention:

FIGURE 1 is a plan view of the machine with a portion of the web cutting mechanism shown in horizontal section, together with a fragmentary portion of the web;

FIGS. 2, 3, 4 and 5 are vertical sectional views through various portions of the machine taken approximately on the lines 2—2, 3—3, 4—4 and 5—5 respectively of FIG. 1.

FIG. 6 is a schematic view illustrating the path of travel of the clamping mechanism and carriage therefor;

Figure 1:
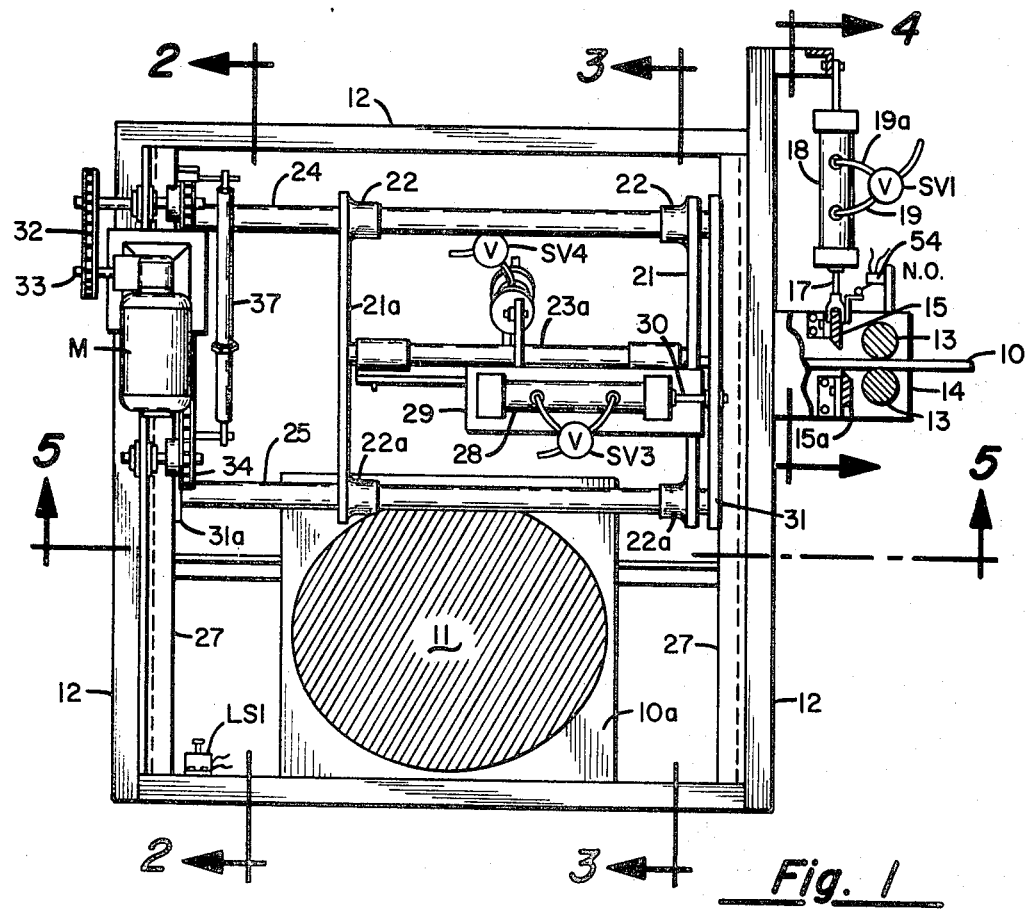

In the drawings the web to be cut into sections of predetermined length is indicated at 10 and the severed sections thereof at 10a. Areas comprising a multiplicity of apertures like those of aperture masks are indicated at 11. As best shown in FIGS. 1 and 5, the web 10 is fed to the machine between vertically disposed parallel rollers 13 which are supported between horizontally extending vertically spaced frame members. These rollers may be power driven, as hereinafter described. Closely adjacent to the rollers 13 and disposed in parallel relation thereto is a cutter comprising a fixed blade 15a and a relatively movable blade 15. The blade 15 is movable to and from the web 10 between guides 16 supported on the frame members 14 so that the cutter operates to cut the sections 10a from the leading end of the web 10.

Suitable power means for actuating the cutter may comprise a fluid pressure actuated piston connected by a rod 17 to the blade 15 and movable in a cylinder 18 adapted to be supplied with fluid under pressure through tubular conduits indicated at 19 and 19a in FIG. 1. Flow of the fluid, either air or liquid, under pressure to and from the cylinder is under control of a solenoid valve SV-1. This valve is energized as hereinafter described to open and close the valve in timed relation to the other power actuated mechanisms of the machine.

Figure 7:
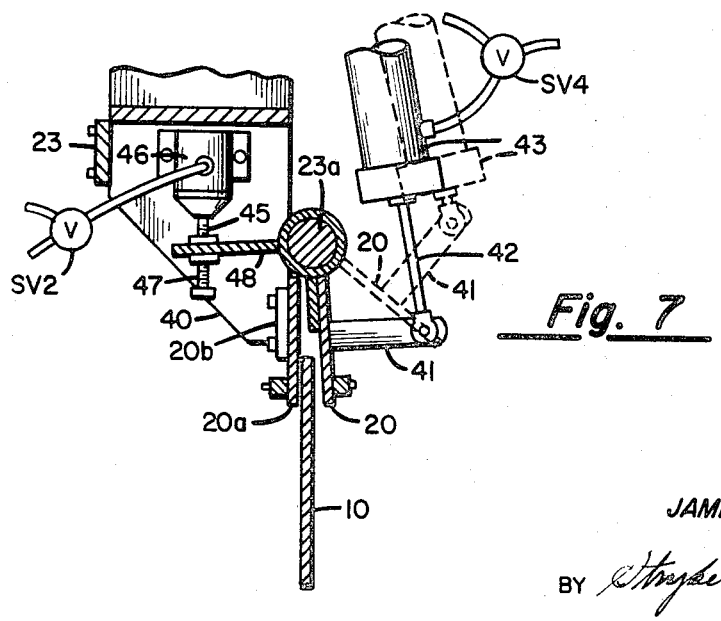
FIG. 7 is a cross sectional view showing details of the clamp and actuating mechanism in web release position.

A pair of horizontally elongated clamp jaws 20–20a are disposed along the path of the web 10 beyond the cutter to receive and grip an upper marginal portion of the web (FIGS. 3 and 7). These jaws are mounted and actuated as hereinafter described in detail on a carriage having spaced parallel end plates 21 and 21a connected together by cross members 23 and 23a. The latter, as shown in FIGS. 3 and 7, is a shaft supporting a clamp jaw 20. Fixed clamp jaw 20a is rigidly supported on a bracket 20a depending and rigidly connected to a frame member 40 of the carriage. Bearing members 22 and 22a of the carriage are tubular in form and slidably fit guide rods 24 and 25. As best shown in FIG. 5, the guide rods 24 and 25 are connected by carriage end frame members 31 and 31a and the carriage is supported on anti-friction rollers 26 which are severally mounted at the ends of the rods 24 and 25 to fit in channel-shaped guides 27. Thus the carriage is supported on the guides 27 for movement transversely of the plane of travel of the web 10.

Fluid pressure actuated means, including a cylinder 28, are provided for moving the carriage from its starting position at the right end of the guide rods 24 and 25, as viewed in FIGS. 1 and 5, to the left end thereof. The cylinder 28 is mounted on a carriage member support 29 and a piston rod 30 projects from an end of this cylinder and is connected to the frame member 31. Flow of fluid under pressure to and from the cylinder 28 is under control of a solenoid actuated valve SV–3. This solenoid valve may be energized to cause the carriage to move along the guide rods 24 and 25 to the left (FIG. 5).

Switch LS-2 is ordinarily closed so that an electric motor M may be energized to move the carriage laterally along the guide channels 27 to the left as viewed in FIG. 3. Mechanism for actuating the carriage laterally out of the path of the advancing web 10 is illustrated in FIGS. 1, 2 and 5. Linkage from the motor M includes a chain 32 and sprockets for actuating a shaft 33 in a predetermined direction and a chain 34 trained on a driving sprocket wheel 35 and on an idling sprocket wheel 36 (FIG. 2). The normally closed limit switch LS-2 is momentarily opened once every revolution of chain 32 by a suitable lever arm. A connecting rod 37 is pivoted at one end to a link of the chain 34 and at the other end to the carriage member 31a so that during each cycle of operation of the chain 34 the carriage is advanced laterally along the guide channels 27 to a position or station where the aperture masks are dropped, and then is returned in a diagonal direction toward the starting point, this motion being caused by a combination of the return of the carriage along the guide rods 24 and 25 and return of the carriage laterally to its starting position by operation of the motor-driven endless chain 34. A single pole-double throw limit switch LS-1 (FIGS. 1 and 5) is operated by the carriage at one end of its lateral movement. This limit switch LS-1 when operated at that time deenergizes the clamp jaws to cause the web section 10a to be dropped.

By repetition of this cycle the severed sections of web 10a may be stacked as indicated in FIG. 3 on a suitable tray-like receptacle 38. This receptacle may be mounted in an inclined position and has a lower edge stop 39 for engagement with the lower edges of the web sections 10a.

Details of the clamp jaw operating mechanism are best shown in FIGS. 3 and 7. The clamp jaw 20 is pivotally supported on the shaft 23a which extends between the end plates 21 and 21a of the carriage. Projecting laterally from the jaw 20 is a rigid arm 41 and hydraulic fluid pressure actuating means are connected to this arm. Suitable actuating means may comprise a piston operated rod 42 projecting from an elongated cylinder 43 to which fluid under pressure is admitted in conventional manner through suitable connecting tubes under control of a solenoid-actuated valve SV 4. The rod 42 is pivotally connected to the arm 41 and the cylinder 43 has a pivotal connection at its upper end to the carriage frame member 29 (FIG. 3). A second piston-connected pin 45 is operated by fluid pressure in a short cylinder 46 of larger diameter than the cylinder 43. The pin 45 is axially aligned with a set screw 47 threaded in an arm 48 which is rigidly connected to the clamp jaw 20. This set screw facilitates the adjustment of the normal position of the arm 48. The opposing jaw 20a is preferably mounted in a fixed position. When the solenoid actuated valve SV 4 is energized the piston rod 42 is moved upwardly to swing the jaw 20 to the fully open position indicated in broken lines in FIG. 7. To close the jaw in gripping engagement with a section of web, the pin 45 is retained in its retracted position and the rod 42 is extended, as indicated in FIG. 3. When the clamp jaws are to be retained in a partially open position such as that shown in full lines in FIG. 7, the pin 45 is extended downwardly so that the pressure exerted on the jaw 20 through the arm 48 and bearing on the shaft 23a is sufficient to stop the jaw 20 in partially open position. As indicated, greater pressure is exerted by the piston in the cylinder 46 than that applied by the pressure in cylinder 43 when both pistons are moved downwardly.

Web feed control

As shown in FIG. 5 the web feeding rollers 13 are power actuated in unison by linkage which includes a continuously driven motor actuated chain 50, a friction clutch 51, a vertical shaft extending axially through and keyed to one of the rollers 13, and an electrically energizable brake 53 operatively connected to the lower end of the shaft 52. Rotary feeding action of the rollers 13 is interrupted momentarily during each cutting stroke of the cutter blade 15. To effect this, as shown in FIG. 1, a normally open switch 54 is positioned to close upon the start of each stroke of the cutter blade 15. Upon the closing of the switch 54 the electric brake 53 (FIG. 5) is applied so that the rotation of the rollers 13 is stopped while the friction clutch 51 becomes operative to allow the power-driven chain 50 to continue in operation. During this brief interval of stoppage of the movement of the web 10 it is free to flex laterally and thereby allow the other mechanisms to continue in operation.

FIG. 8 circuits

A masterly relay CRM is energized upon the closing of a master switch 70. Heat sensor switches in this circuit are normally closed, the heat sensors being included in the power circuit for the motor M. Fuses F1, F2, F3, F4, and F5 are included in branches 75, 76, 77, 78 and 79 of a circuit 71 which is energized by the secondary coil of a transformer 72. Upon the energization of the master relay CRM, its contacts a and b are closed. Contact a closes the common return or ground line 81 for the various relays and contact b closes the power line circuit 85 for the relays and energizes pilot light 67.

Solenoid valve SV1 for controlling the operation of the cutter 15 is energized by operation of the cut relay 1CR which is energized momentarily through a branch of the circuit including the relay TR1. Upon energization, relay 1CR closes its contacts a and b. Contact a closes a branch circuit to energize clamp relay 2CR and time relay TR2 and the closing of contact b energizes a counter 68 for indicating the number of web sections that are cut and energizes time delay relay TR1. Contact a of relay 2CR when closed energizes solenoid valve SV2 and this circuit is held closed through contact a of limit switch LS1 thereby holding the plunger 45 in cylinder 46 (FIG. 7) retracted.

Power is supplied to the motor M through lines L1, L2, L3 under control of a motor relay MR having contacts a, b and c severally included in power lines L1, L2 and L3 so that the motor M is operated intermittently as relay MR is energized and de-energized. A circuit 74 including the coil of relay MR is closed when a contact a of a relay TR2 is closed. Relay TR2 provides a short delay for the movement of the carriage to its leftmost position. When relay MR is energized through circuit 74, it latches on through its contact a and the closed contact of LS2. Limit switch LS2 as shown in FIGS. 2 and 5 is located in position to be momentarily opened once every revolution of the chain 34 to break the latching circuit to de-energize motor M. The motor coasts far enough to allow LS2 to close to be ready for the next cycle.

When limit switch LS1 is operated to open its contact a and close its contact b, TR2 and 2CR are de-energized and the coil of a relay 4CR is energized thereby causing the energization of solenoid valve SV4. This opens clamp jaw 20 to release a section 10a of the web from the grasp of the clamp jaws 20 and 20a. This occurs when the carriage arrives with a web section above the tray 38.

Solenoid valve SV3, when de-energized by contact a of 2CR opening, causes the piston in cylinder 28 to return the carriage to its starting position. At the same time solenoid valve SV4, being energized from power line 77 causes the piston 42 in cylinder 43 to retract the clamp jaw 20 to its wide open position indicated by broken lines in FIG. 7. With clamp jaw 20 fully retracted the path is cleared for the movement of the clamp over the next portion of the web 10 to a position for clamping between the jaws 20 and 21a. This is necessary to allow the carriage to return along the oblique path indicated in FIG. 6. When the carriage withdraws from the drop position (FIG. 6), contact a of LS1 closes and b opens, however, 4CR is latched on from line 76a through closed contact LS2. When the carriage reaches the cut position (FIG. 6), LS2 is momentarily opened which de-energizes 4CR and MR so that the circuit is ready to start a new cycle.

Photoelectric cell

Figure 8:
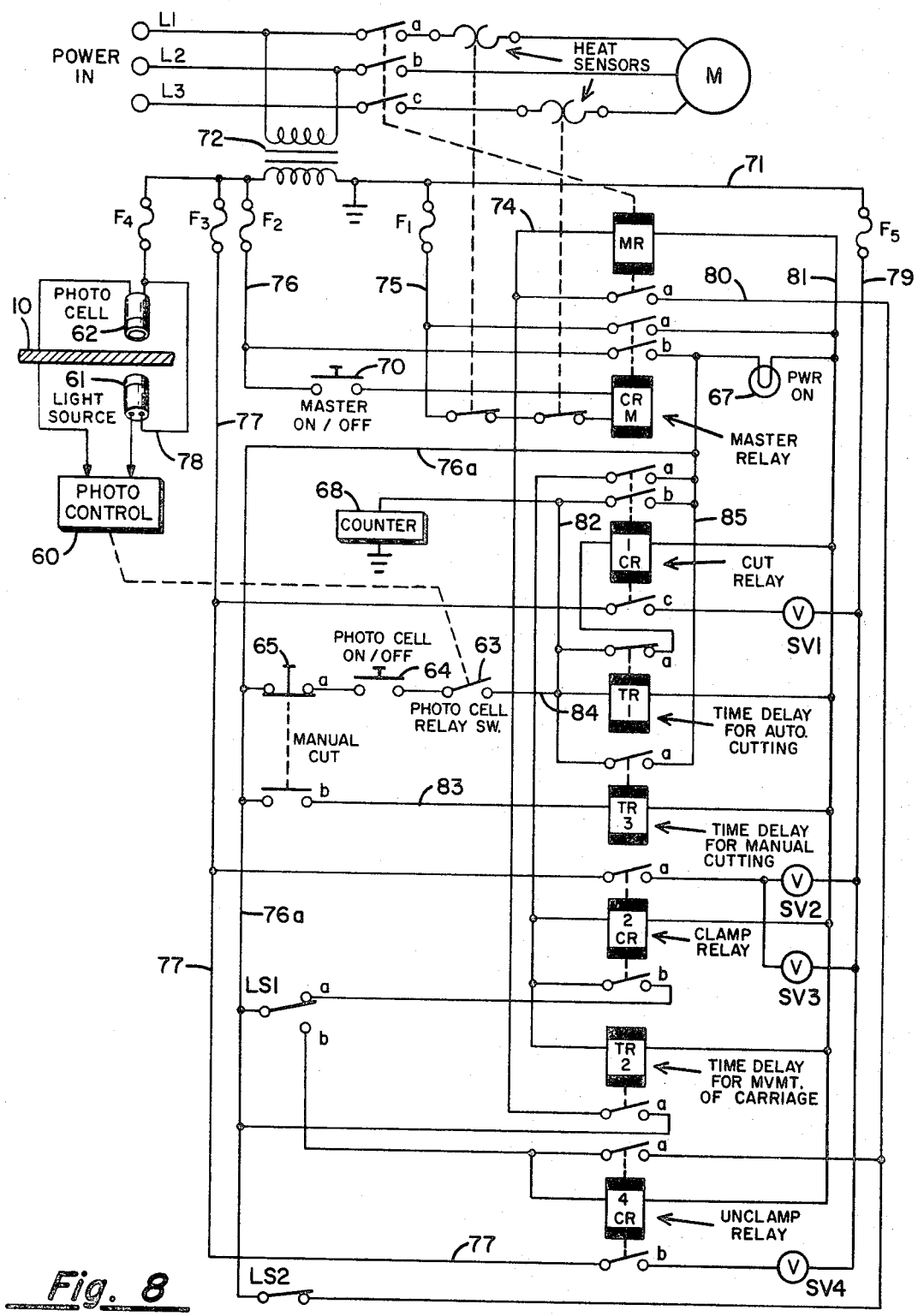
FIG. 8 is a schematic view of the circuits including the electrical elements of the machine.

As indicated in the wiring diagram (FIG. 8) a photoelectric control indicated generally at 60 may be activated periodically by means of a light source 61 coacting with a photocell 62 at the opposite side of the web 10. Since foraminous areas of the web pass the light source alternately with opaque areas, the photo control may be activated either upon the passage of an opaque area or a foraminous area. The latter may be the multiplicity of apertures of a mask or suitably located holes or slots formed in the opaque web areas at intervals corresponding to the length of the web sections to be cut. Photo control 60 has a mechanical connection with a primary relay switch 63. This switch is included in a branch circuit 84 which also includes the coil of time delay relay TR1 and, preferably, a manual photo control switch 64 and a normally closed manual cut control switch 65.

Cutter circuits

For automatic cutting, the coil of relay 1CR is energized initially by an impulse transmitted through a normally closed contact a of relay TR1 and is latched on by branch 82 through contact b of 1CR. A circuit including the solenoid valve SV1 is thereby closed through the operation of a normally open contact C of relay 1CR. When SV1 is energized from power line 77, as best shown in FIG. 1, the solenoid valve SV1 supplies fluid under pressure to the cylinder 18 whereby the piston rod 17 is caused to actuate the cutter 15 to cut a section from the web 10, as hereinbefore described. Time for the operation and return of the cutter is provided by the time delay relay TR1.

It will be evident that each of the relays TR1, TR2 and TR3 are delayed action relays, whereas the master relay CRM, and cut relay 1CR, the clamp relay 2CR and unclamp relay 4CR are quick acting relays.

Summary of operations

Manual cut switch 65 may be used in an emergency in the event of a failure of the automatic mechanism such as the cutter, clamp, carriage and unclamp electric controls. Manual switch 65 is normally closed at its contacts a and has normally open contacts b which may be closed to energize a time delay switch TR3 in a circuit 83. Contacts a of TR3 are normally open and are closed to energize TR1 and cut relay 1CR from power line 85.

As an example of the operation of this invention in the manufacture of aperture masks for color television tubes, it may be assumed that the web 10 is moving at the rate of 100 inches per minute and that the rollers 13 are driven at a corresponding peripheral speed through the operation of motor M2, speed reduction transmission T and drive chain 50 (FIG. 5). From the energization of the solenoid valve SV1 the cutter 15 is operated to sever a section of the web. As it starts its stroke the normally open switch 54 closes the circuit for energizing the brake 53 which stops the rollers 13 momentarily during the stroke of the cutter and return to retracted position.

After the slight delay caused by the operation of the time delay relay TR1 and energization of the clamp relay 2CR the latter causes the solenoid valve SV2 to allow the clamp jaw 20 to be forcibly closed on the severed section 10a of the web and the severed section is immediately moved to the left (FIGS. 1 and 5). After suitable delay to ensure that the carriage has reached its leftmost position, contact a of TR2 closes to energize MR to start motor M as hereinbefore described. Thereupon, the carriage is moved along the lateral guides to the drop position where limit switch LS1 operates to energize the unclamp relay 4CR. The carriage is then moved obliquely to its starting position as indicated in FIG. 6. During this interval for the travel of the carriage from the cut position to its drop position and return to cut position, another section of the web has moved into position to be clamped between the clamp jaws. This cycle of operation is then repeated automatically.

It will be understood that various modifications of the invention as described in detail herein may be made within the scope of the appended claims.

I claim:

1. A machine for cutting off leading end sections of predetermined length from an elongated web of substantial width which is continuously moving longitudinally on edge in a substantially vertical plane comprising: cutting means disposed to cut across the width of the web for severing a leading end section of predetermined length from said web; vertical roller means for feeding the web on edge in a vertical plane to said cutting means; means for intermittently momentarily stopping said roller feeding means and for simultaneously actuating said cutting means; means for removing each severed section of web away from the said web; and means for stacking a succession of said severed sections.

2. A machine in accordance with claim 1 in which said means for removing the severed sections away from the web includes: clamp jaw means disposed to grip the upper edge of said leading end section of the web prior to cutting; and means for opening said jaws to release the severed section of the web for stacking.

3. A machine in accordance with claim 2 in which said jaw means are mounted on a carriage, and including means for moving said carriage after operation of said cutting means while said jaws are gripping the severed section of web from said web gripping location to a web stacking location where said jaws release the severed section and back to said web gripping location in a cycle which is completed during the movement of the web a distance substantially equal to the length of a severable leading end.

4. A machine in accordance with claim 3 having electrically energizable fluid pressure means for reciprocatingly moving said carriage along the same line of travel as said webbing from and to said web gripping location.

5. A machine in accordance with claim 4 further including electrical means for energizing in synchronized sequence each of said means for stopping said feed roller, said means for actuating said cutting means, and said means for reciprocatingly moving said carriage.

6. A machine in accordance with claim 5 in which said means for stopping said feed rollers comprises: an electrically energizable brake; and circuit means including a switch disposed to energize said brake during each web cutting operation.

7. A machine according to claim 2 in which said clamp jaw means are operated to grip and release a section of the web by electrically energizable fluid pressure means.

8. A machine for cutting sections of predetermined length from an elongated web of substantial width in continuous motion longitudinally on edge in a substantially vertical plane along a predetermined path, comprising: guiding means extending along and laterally of said path; a clamp jaw carriage supported on said guiding means for reciprocating movement along and laterally of said path; means for imparting to said carriage reciprocating movement along said path; clamp jaws mounted on said carriage in position to grip the upper margin of a leading section of said web; means for intermittently momentarily stopping the movement of said leading section of web; web cutting means disposed to sever said leading end section of predetermined length from said web while it is momentarily stopped; means for closing said clamp jaws substantially simultaneously with said cutting means for gripping the severed section in said jaws; means for energizing said reciprocating means to move said carriage in said guiding means in a forward direction in timed relation to the operation of said cutting and gripping means whereby to separate the severed section from said web; and means for opening said jaws for releasing said severed section after the severed section has been separated from said web.

9. A machine in accordance with claim 8 in which said guiding means include: first guide members extending along the direction of said web travel path and second guide members extending laterally to said path; and power means for moving said carriage in said first and second guide members.

10. A machine in accordance with claim 8 including electrical means for energizing in synchronized sequence each of said momentarily stopping means, said clamp jaw means, said cutting means, and said means for reciprocatingly moving said carriage in said guiding means.

11. A machine in accordance with claim 10 in which said momentary stopping means, said carriage, said clamp jaws and said cutting means are actuated by electrically energizable fluid pressure means.

12. The machine as in claim 10 wherein said synchronizing electrical energization means is operatively responsive to sensing means trained on said moving web to detect clear and opaque areas.

13. The machine as in claim 11 wherein said clamp jaw actuating means opens said jaws to release the severed section when said carriage is in the lateral guiding means path and opens said jaws still further to pass over said web when said carriage returns to its starting location in said guiding means.

References Cited
UNITED STATES PATENTS

| | | | |
|---|---|---|---|
| 2,831,684 | 4/1958 | Cundall | 83—154 X |
| 3,126,848 | 3/1964 | Gastonguay | 83—80 X |
| 3,177,749 | 4/1965 | Best et al. | 83—94 X |
| 3,269,236 | 8/1966 | Johnson et al. | 83—154 X |

JAMES M. MEISTER, *Primary Examiner.*

U.S. Cl. X.R.

83—94, 153, 236